United States Patent
Tsuzaki et al.

(10) Patent No.: US 11,965,796 B2
(45) Date of Patent: Apr. 23, 2024

(54) ULTRASONIC WAVE PROPAGATION MEMBER

(71) Applicant: HONDA MOTOR CO., LTD., Tokyo (JP)

(72) Inventors: Kazuhiro Tsuzaki, Tokyo (JP); Toshitsugu Sakakibara, Tokyo (JP); Hiroki Hirai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/897,520

(22) Filed: Aug. 29, 2022

(65) Prior Publication Data

US 2023/0067817 A1    Mar. 2, 2023

(30) Foreign Application Priority Data

Aug. 31, 2021  (JP) .................. 2021-140827

(51) Int. Cl.
  *G01L 5/00*  (2006.01)
  *G01L 5/24*  (2006.01)

(52) U.S. Cl.
  CPC .................. *G01L 5/246* (2013.01)

(58) Field of Classification Search
  CPC ....................................... G01L 5/246
  See application file for complete search history.

(56) References Cited

U.S. PATENT DOCUMENTS

| | | | |
|---|---|---|---|
| 2020/0040929 A1* | 2/2020 | Tsuzaki | G01N 29/07 |
| 2020/0355565 A1* | 11/2020 | Kim | G01L 5/166 |

FOREIGN PATENT DOCUMENTS

| | | | | |
|---|---|---|---|---|
| JP | H0594762 U | * | 12/1993 | |
| JP | 2002365270 A | * | 12/2002 | |
| JP | 2005241337 A | * | 9/2005 | G01N 29/07 |
| JP | 5927394 B1 | * | 6/2016 | A61B 8/06 |
| JP | 2020-020749 A | | 2/2020 | |

* cited by examiner

*Primary Examiner* — Jamel E Williams
(74) *Attorney, Agent, or Firm* — Rankin, Hill & Clark LLP (57) ABSTRACT

An ultrasonic wave propagation member, which is able to improve durability while ensuring measurement performance, is provided with an ultrasonic wave propagator including a first contact surface coming into contact with an measurement target, and a second contact surface provided opposite to the first contact surface and coming into contact with a fore end surface of an ultrasonic probe; and a holder holding the ultrasonic wave propagator and including a third contact surface coming into contact with the measurement target on a radially outer position than the first contact surface, wherein the ultrasonic wave propagator is softer than the holder.

9 Claims, 5 Drawing Sheets

ULTRASONIC WAVE PROPAGATION MEMBER

CROSS REFERENCE TO RELATED APPLICATIONS

This application claims benefit of foreign priority to Japanese Patent Application No. JP2021-140827 filed on Aug. 31, 2021; which is incorporated by reference in its entirety.

TECHNICAL FIELD

The present invention relates to a member for propagating an ultrasonic wave generated by an ultrasonic probe to a measurement target.

BACKGROUND ART

When a bolt (clamping) axial force for clamping a bolt is measured using an ultrasonic probe, an elastomer member is placed so as to fill a gap between the ultrasonic probe and a bolt head (see PTL 1).

CITATION LIST

Patent Literature

[PTL 1]
Japanese Unexamined Patent Publication: No. 2020-20749

SUMMARY OF INVENTION

Technical Problem

Because the elastomer member is used in a state of being compressed to be deformed by a load between an ultrasonic probe and a measurement object (bolt), it is difficult to achieve measurement performance and durability together.

Problem to be Solved

In consideration of the above problems, it is an object of the present invention to provide an ultrasonic wave propagation member capable of improving the durability while ensuring the measurement performance.

Solution to Problem

In order to solve the above-described problems, the present invention provides an ultrasonic wave propagation member including an ultrasonic wave propagator configured to include a first contact surface that comes into contact with an measurement target and a second contact surface that is provided opposite to the first contact surface and comes into contact with a fore end surface of an ultrasonic probe; and a holder configured to hold the ultrasonic wave propagator and to include a third contact surface that comes into contact with the measurement target on a radially outer position than the first contact surface, wherein the ultrasonic wave propagator is softer than the holder.

DESCRIPTION OF EMBODIMENTS

An embodiment of the present invention is described below, taking a case in which an axial force of a bolt is measured using an ultrasonic probe as an example of adopting the bolt for a measurement target with reference to the drawings appropriately as needed. The same components are denoted by the same reference signs, and double descriptions are omitted. Note that the measurement target according to the present invention is not limited to a bolt, and the ultrasonic wave propagation member according to the present invention can be used in combination with a device for measuring a size, an axial force, and the like of the measurement target using an ultrasonic probe.

First Embodiment

Figure 1:
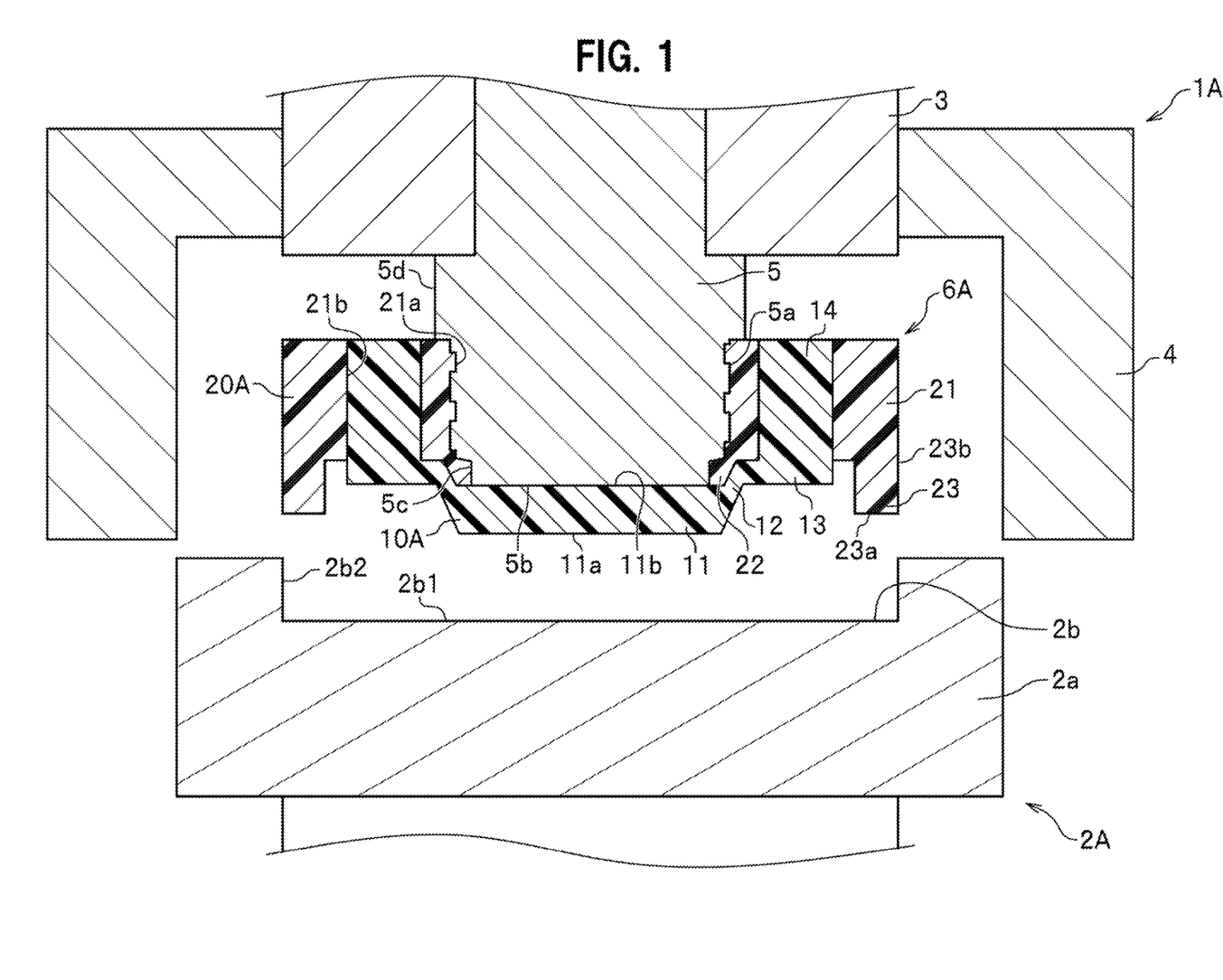
FIG. 1 is a diagram schematically showing a clamping device according to a first embodiment of the present invention.

As shown in FIG. 1, a clamping device (nut runner) 1A according to the first embodiment of the present invention is also a bolt axial force measuring device for measuring a bolt axial (clamping) force generated when clamping a bolt 2A. The bolt axial force measuring device rotates the clamping device 1A attached on the bolt 2A to clamp the bolt 2A by driving a drive unit (not shown) such as a motor using a controller (not shown). The controller of the bolt axial force measuring device calculates a bolt axial force on a basis of an echo of an ultrasonic pulse when clamping the bolt. The clamping device 1A includes a rotating shaft 3, a socket 4, an ultrasonic probe 5, and an ultrasonic wave propagation member 6A.

<Rotating Shaft>

The rotating shaft 3 is a cylindrical member that rotates at a predetermined torque and a rotational speed (rotational angular velocity) under control of the controller (not shown).

<Socket>

The socket 4 is a cylindrical member fitted onto the rotating shaft 3 and the bolt 2A. A base end (upper end) of the socket 4 is detachably fitted and fixed onto a fore end (lower end) of the rotating shaft 3. A fore end (lower end) of the socket 4 can be externally fitted onto a head 2a of the bolt 2A.

<Ultrasonic Probe>

The ultrasonic probe 5 is a substantially cylindrical member attached to the fore end (lower end) of the rotating shaft 3 in the socket 4. The ultrasonic probe 5 is provided with a piezoelectric element or the like that oscillates an ultrasonic pulse and receives an echo of the oscillated ultrasonic pulse. The ultrasonic probe 5 may be attached to the fore end of the rotating shaft 3 through a support member, an elastic coil spring, or the like (not shown). A male screw 5a is formed on an outer peripheral surface of the ultrasonic probe 5. A fore end surface (lower end surface) 5b of the ultrasonic probe 5 can come into contact with a base end surface (upper surface) of a body of an ultrasonic wave propagator 10A described later. Further, on a more distal fore end portion (lower portion) of the outer peripheral surface of the ultrasonic probe 5 than the male screw 5a there is not formed the male screw 5a, but a small diameter portion 5c having a smaller diameter than the male screw 5a. On a portion closer to a base end (upper portion) of the outer peripheral surface of the ultrasonic probe 5 than the male screw 5a, there is not formed the male screw 5a, but a large diameter portion 5d having a larger diameter than the male screw 5a. The diameter of the large diameter portion 5d is configured to be larger than a diameter of a female screw 21a and smaller than a diameter of a radially inner end of a hole 21b.

<Ultrasonic Wave Propagation Member>

Figure 2A:
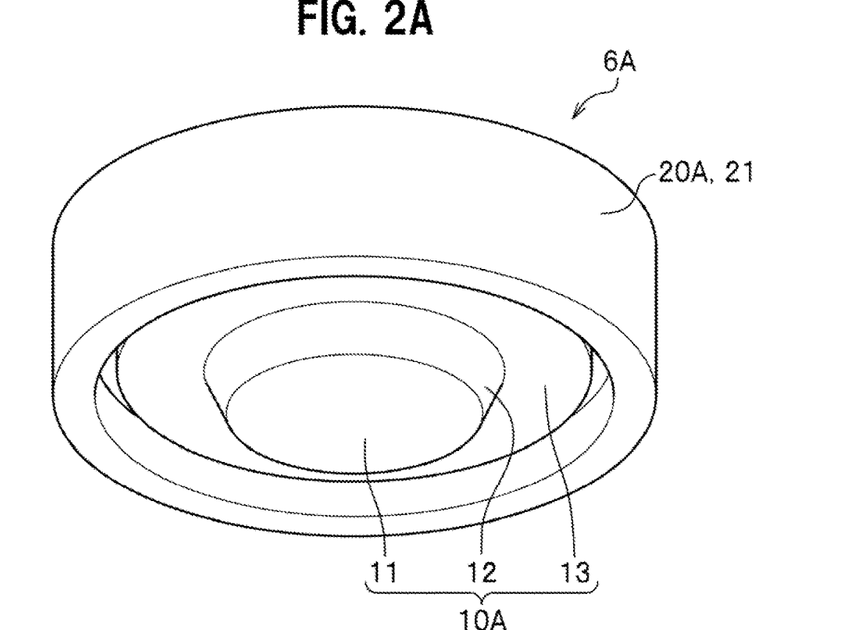
FIGS. 2A and 2B are perspective views schematically showing an ultrasonic wave propagation member.
Figure 2B:
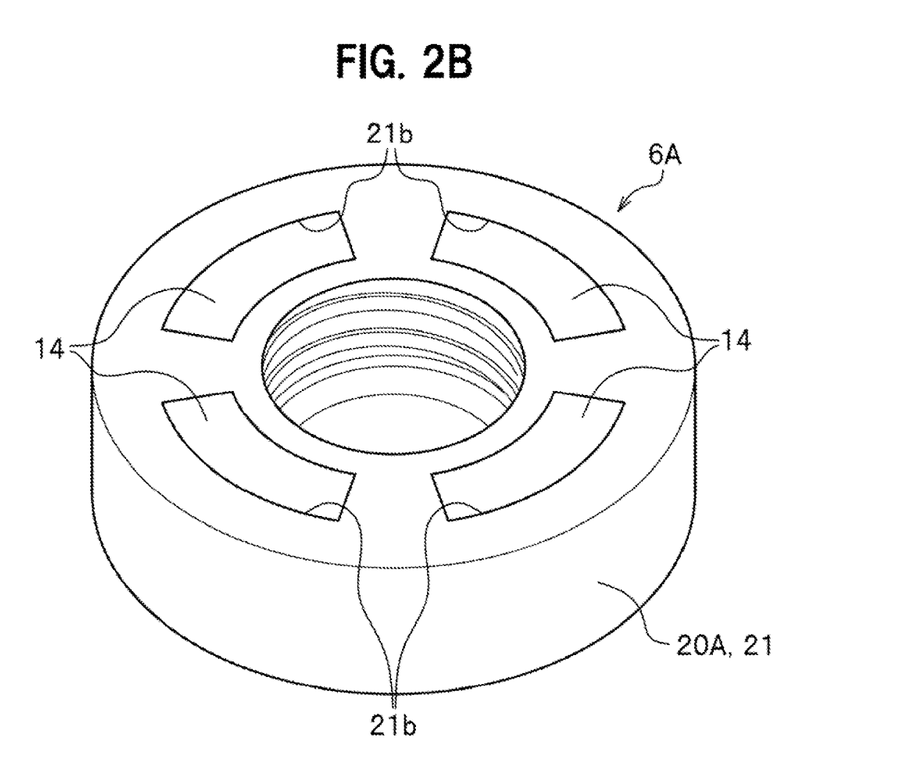

The ultrasonic wave propagation member 6A is a resin member having a bottom and a substantially cylindrical shape and attached to the fore end (lower end) of the ultrasonic probe 5 in the socket 4. The ultrasonic wave propagation member 6A fills a gap between the ultrasonic probe 5 and the head 2a of the bolt 2A to propagate an ultrasonic pulse oscillated from the ultrasonic probe 5 to the bolt 2A or to propagate an echo of the ultrasonic pulse from the bolt 2A to the ultrasonic probe 5. As shown in FIGS. 1, 2A, and 2B, the ultrasonic wave propagation member 6A according to the first embodiment of the present invention includes an ultrasonic wave propagator 10A and a holder 20A.

<Ultrasonic Wave Propagator>

The ultrasonic wave propagator 10A is a member propagating an ultrasonic pulse between the ultrasonic probe 5 and the bolt 2A. The ultrasonic wave propagator 10A is made of a material softer than the holder 20A, more specifically, a soft material that can be compressed to be deformed in an axial direction (vertical direction) in an elastically deformable region in a state of being attached on the bolt 2A, for example, an elastomer in this embodiment. The ultrasonic wave propagator 10A integrally includes a body 11, a first extension 12, a second extension 13, and a projection 14.

The body 11 is a disk-shaped portion that propagates an ultrasonic pulse. A fore end surface (lower surface) of the body 11 includes a first contact surface 11a contacting with a bottom surface 2b1 of a recess 2b that has a circular shape in plan view and is formed in the head 2a of the bolt 2A. The base end surface (upper surface) of the body 11 opposite to the first contact surface 11a includes a second contact surface 11b contacting with the fore end surface (lower end surface) 5b of the ultrasonic probe 5.

The first extension 12 is a portion extending radially outward from a radially outside end of the body 11. The first extension 12 is configured to extend upward as it extends radially outward.

The second extension 13 extends radially outward from a radially outside end of the first extension 12. The second extension 13 extends in a direction perpendicular to the axial direction of the rotating shaft 3, the socket 4, and the ultrasonic probe 5.

The projection 14 extends upward from the second extension 13. The projection 14 has an arc shape in plan view. In this embodiment, the four projections 14 are formed circumferentially apart at equal intervals.

<Holder>

The holder 20A is a member for holding the ultrasonic wave propagator 10A onto the ultrasonic probe 5. The holder 20A is made of a material that is harder than the ultrasonic wave propagator 10A, more specifically, a hard material that can determine a position with respect to the bolt 2A in a state of being attached to the bolt 2A, for example, polypropylene in this embodiment. The holder 20A includes integrally a body 21, a first extension 22, and a second extension 23. The material of the holder 20A is not limited to polypropylene, but may be any material that is harder, i.e., higher in hardness, than the ultrasonic wave propagator 10A and is able to perform functions such as holding the ultrasonic wave propagator 10A, fixing the ultrasonic wave propagator 10A to the ultrasonic probe 5, and positioning the ultrasonic probe 5 with respect to the recess 2b of the bolt 2A.

The body 21 is a portion having a cylindrical shape. The body 21 has the female screw 21a formed on an inner peripheral surface thereof. The female screw 21a is one example of a fixing portion fixed to the outer peripheral surface of the ultrasonic probe 5. There is formed in the body 21 an arc-shaped hole 21b vertically penetrating the body 21. In this embodiment, four holes 21b corresponding to the four projections 14 are formed circumferentially at equal intervals.

The first extension 22 is an annular portion extending downward from a radially inner fore end of the body 21. The first extension 22 extends radially inward as it goes downward. The first extension 22 works to position the fore end of the ultrasonic probe 5 with its such shape. A lower surface of the first extension part 22 comes into contact with an upper surface of the body 11 of the ultrasonic wave propagator 10A, thereby stabilizing compressive deformation of the body 11.

The second extension 23 is an annular portion extending downward from a radially outer fore end of the body 21. The second extension 23 extends downward more than the first extension 22. A fore end surface (lower surface) of the second extension 23 forms a third contact surface 23a contacting with the bottom surface 2b1 of the recess 2b of the bolt 2A. The third contact surface 23a is positioned radially outside more than the first contact surface 11a and the second contact surface 11b of the ultrasonic wave propagator 10A. An outer peripheral surface of the second extension 23 forms a fourth contact surface 23b that contacts with an inner peripheral surface 2b2 of the recess 2b of the bolt 2A.

<Fixing Method of Ultrasonic Wave Propagator and Holder>

The ultrasonic wave propagator 10A is fixed to the holder 20A by having the projection 14 inserted (press-fitted) into the holes 21b of the holder 20A from below or by simultaneous molding (integral molding) in such a state. In the fixed state, the upper surface of the body 11 comes into contact with a lower surface of the first extension 22, an inner peripheral surface of the first extension 12 with the outer peripheral surface of the first extension 22, and an upper surface of the second extension 13 with the lower surface of the body 21, respectively. The third contact surface 23a, which is the lower surface of the second extension 23, is positioned between the first contact surface 11a, which is the lower surface of the body 11, and the second contact surface 11b, which is the upper surface of the body 11, in the axial direction of the ultrasonic probe 5. That is, before being attached on the bolt 2A, the third contact surface 23a is positioned above the first contact surface 11a and below the second contact surface 11b.

<Fixing Method of Ultrasonic Wave Propagation Member and Ultrasonic Probe>

The ultrasonic wave propagation member 6A is fixed to the ultrasonic probe 5 by the female screw 21a formed on the inner peripheral surface of the body 21 being screwed into the male screw 5a formed on the outer peripheral surface of the ultrasonic probe 5. In the fixed state, the fore end surface (lower end surface) 5b of the ultrasonic probe 5 comes into contact with the second contact surface 11b, which is the upper surface of the body 11. Further, the small diameter portion 5c of the ultrasonic probe 5 comes into contact with a lower end portion of the inner peripheral surface of the first extension 22 (a portion where the female screw 21a is not formed). Further, a surface (downward surface) that is a boundary between the male screw 5a and the large diameter portion 5d of the ultrasonic probe 5 comes into contact with the base end surface (upper surface) of the body 21. The above described contacts determine relative positioning to each other of the ultrasonic probe 5 and the ultrasonic wave propagation member 6A.

<Method of Attaching Clamping Device to Bolt>

Figure 3:
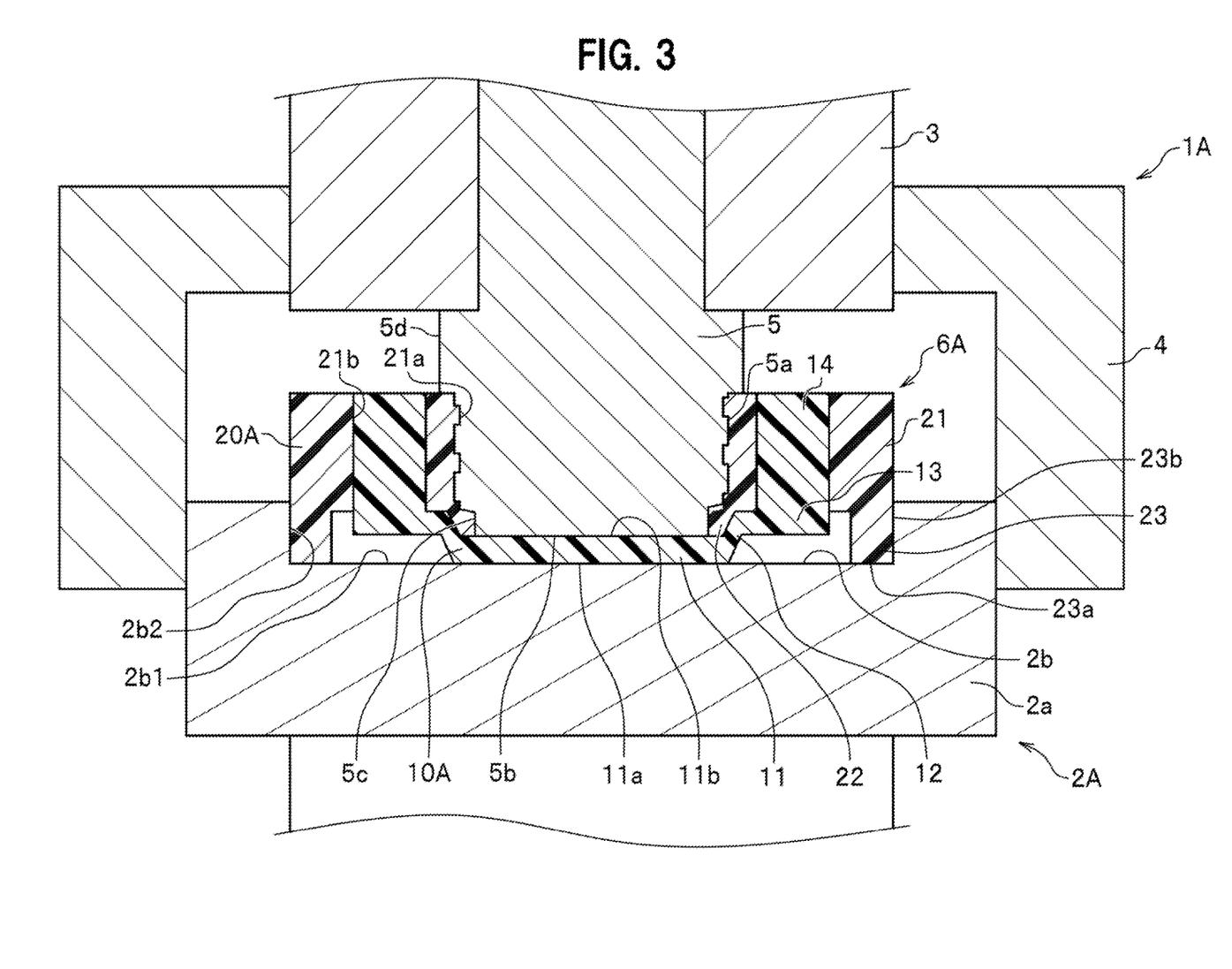
FIG. 3 is a diagram schematically showing a state of a clamping device attached on a bolt.

The socket 4 is externally fitted onto the head 2a of the bolt 2A. Here, the ultrasonic wave propagation member 6A is inserted into the recess 2b formed in the head 2a of the bolt 2A and thereby attached to the bolt 2A. The fourth contact surface 23b, which is the outer peripheral surface of the second extension 23, comes into contact with the inner peripheral surface 2b2 of the recess 2b. This results in the suitable positioning of the ultrasonic wave propagation member 6A and the ultrasonic probe 5 in a direction perpendicular to their axes. In addition, the first contact surface 11a, which is the lower surface of the body 11, and the third contact surface 23a, which is the lower surface of the second extension 23, are brought into contact with the bottom surface 2b1 of the recess 2b. Here, the body 11 and the first extension 12 are compressed to be deformed so that the first contact surface 11a, which is the lower surface of the body 11, is positioned at the same height as the third contact surface 23a.

The outer peripheral surface of the first extension 12 has a tapered shape that tapers downward so that the body 11 and the first extension 12 are easily compressed to be vertically deformed. A clearance is secured between the outer peripheral surface of the first extension 12 and the inner peripheral surface of the second extension 23 for the body 11 and the first extension 12 to be compressed and deformed.

In the above state, the controller (not shown) drives a drive unit (not shown) such as a motor and thereby rotates the rotating shaft 3 and the socket 4. This causes the bolt 2A to be screwed into a hole (not shown) and clamped. Next, the controller (not shown) drives the ultrasonic probe 5 to cause the ultrasonic probe 5 to oscillate an ultrasonic pulse. The ultrasonic pulse is propagated through the body 11 of the ultrasonic wave propagator 10A to the bolt 2A. The ultrasonic probe 5 receives an echo from the head 2a of the bolt 2 (the bottom surface 2b1 of the recess 2b) and an echo from the fore end surface (bottom surface) of a shaft portion of the bolt 2A and outputs received results to the controller (not shown).

The controller (not shown) calculates the bolt axial force on the basis of the receiving result.

The ultrasonic wave propagation member 6A according to the first embodiment of the present invention includes the ultrasonic wave propagator 10A having the first contact surface 11a contacting with an measurement target (bolt 2A) and the second contact surface 11b that is opposite to the first contact surface 11a and comes into contact with the fore end surface 5b of the ultrasonic probe 5; and a holder 20A holding the ultrasonic wave propagator 10A and having the third contact surface 23a contacting with the measurement target on the radially outer position than the first contact surface 11a, wherein the ultrasonic wave propagator 10A is softer than the holder 20A.

As described above, because the ultrasonic wave propagator 10A is softer than the holder 20B, the third contact surface 23a of the holder 20B allows the ultrasonic wave propagation member 6A to have an amount of compressive deformation of the body 11 and the first extension 12 of the ultrasonic wave propagator 10A suitably configured so that durability of the ultrasonic wave propagator 10A is improved while ensuring its measurement performance.

In the ultrasonic wave propagation member 6A, the first contact surface 11a is positioned closer to the measurement target than the third contact surface 23a before the ultrasonic wave propagation member 6A is attached to the measurement target.

Therefore, the ultrasonic wave propagation member 6A can be regulated in an amount of projection of the first contact surface 11a with respect to the third contact surface 23a so that the amount of the compressive deformation of the body 11 and the first extension 12 of the ultrasonic wave propagator 10A is suitably adjusted, which allows the durability of the ultrasonic wave propagator 10A to be improved while the measurement performance is ensured.

In the ultrasonic wave propagation member 6A, the holder 20A is provided with a fixing portion fixed to the outer peripheral surface of the ultrasonic probe 5.

Therefore, because the ultrasonic wave propagation member 6A is fixed to the ultrasonic probe 5 at the holder 20A that is harder than the ultrasonic wave propagator 10A, the fixing intensity to the ultrasonic probe 5 can be improved to support an accurate measurement.

In the ultrasonic wave propagation member 6A, the fixing portion is the female screw 21a that is engaged with the male screw 5a formed on the outer peripheral surface of the ultrasonic probe 5.

Therefore, because the holder 20A of the ultrasonic wave propagation member 6A is fixed to the ultrasonic probe 5 by the screw engagement, the fixing intensity to the ultrasonic probe 5 can be further improved, which can support more accurate measurement.

In the ultrasonic wave propagation member 6A, the first contact surface 11a and the third contact surface 23a contact with the bottom surface 2b1 of the recess 2b formed on the head 2a of the measurement target (bolt 2A), and the holder 20A includes the fourth contact surface 23b coming into contact with the inner peripheral surface 2b2 of the recess 2b.

Therefore, the ultrasonic wave propagation member 6A is able to improve the positioning accuracy and the fixing intensity onto the measurement target to support accurate measurement.

In the ultrasonic wave propagation member 6A, the ultrasonic wave propagator 10A is made of elastomer.

Therefore, the ultrasonic wave propagation member 6A is able to improve adhesion of the measurement target to the ultrasonic probe 5 to support accurate measurement.

The ultrasonic wave propagation member 6A has the holder 20A made of polypropylene.

Therefore, the above polypropylene is harder than the ultrasonic wave propagator 10A, the ultrasonic wave propagation member 6A is able to prevent the ultrasonic wave propagator 10A from being too compressed and to regulate a load in a suitable range.

Second Embodiment

Figure 4:
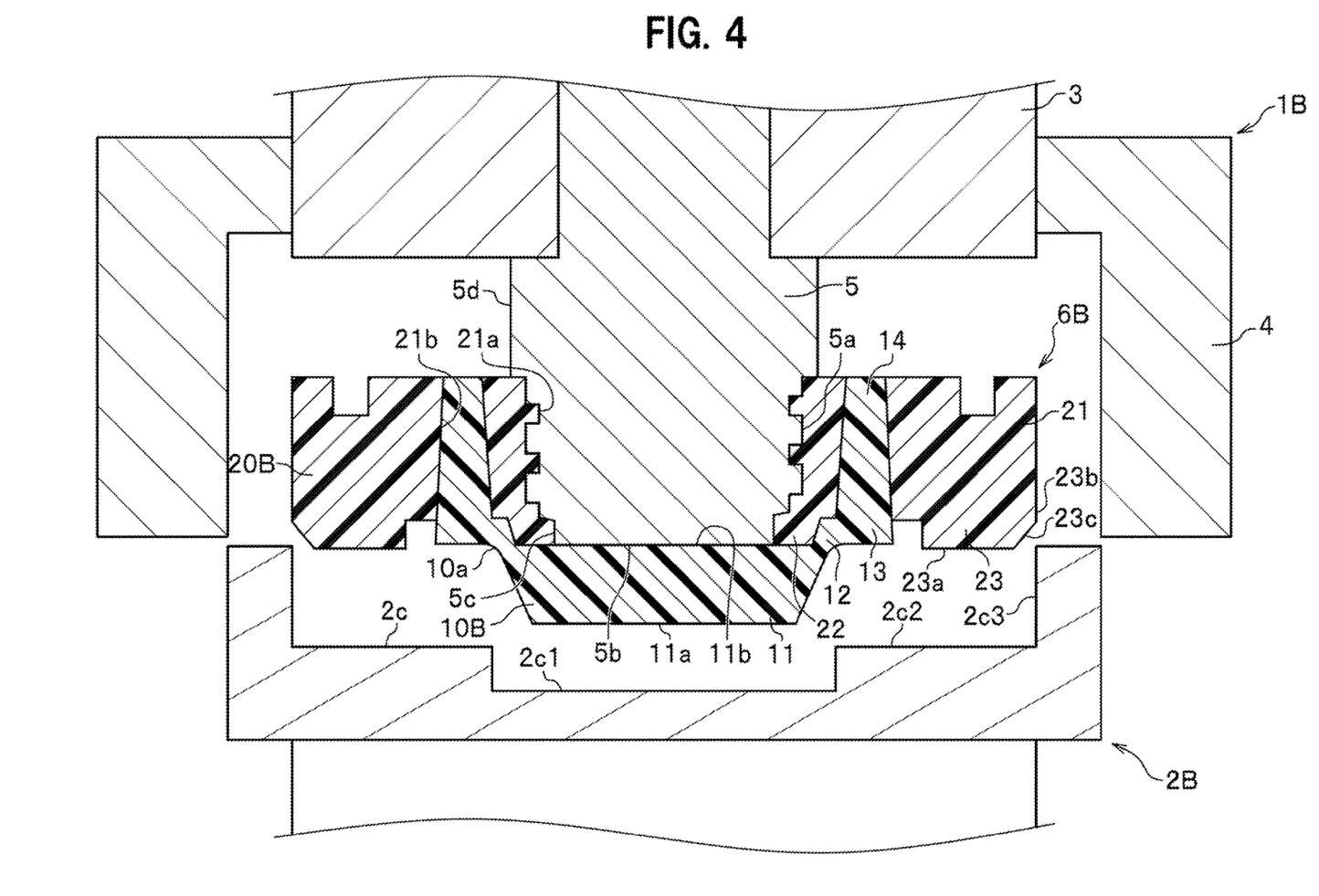
FIG. 4 is a diagram schematically showing a clamping device according to a second embodiment of the present invention.

Next, a description is given of a clamping device according to a second embodiment of the present invention, focusing on its differences from the first embodiment. As shown in FIG. 4, a recess 2c of the bolt 2B has a bottom surface 2c1 that is radially close to a center and formed deeper than a bottom surface 2c2 radially close to an outside.

A clamping device 1B according to the second embodiment of the present invention includes an ultrasonic wave propagation member 6B having an ultrasonic wave propagator 10B and a holder 20B in place of the ultrasonic wave propagation member 6A.

In the ultrasonic wave propagator 10B, a boundary (corner portion) between the outer peripheral surface of the first extension 12 and the lower surface of the second extension 13 is an R portion 10a having a round shape. This results in preventing a cracking due to the compressive deformation of the body 11 and the first extension 12.

In the ultrasonic wave propagator 10B, the projection 14 has a shape that radially tapers toward a head end (upper ward). In the holder 20B, the hole 21b formed in the body 21 has a shape corresponding to the projection 14.

In the ultrasonic wave propagator 10B, a boundary portion between the third contact surface 23a and the fourth contact surface 23b is a chamfered portion 23c. This causes the chamfered portion 23c to serve as a guide to help the ultrasonic wave propagation member 6B to be easily attached to the recess 2c of the bolt 2B.

<Method of Attaching Clamping Device 1B on Bol 2Bt>

Figure 5:
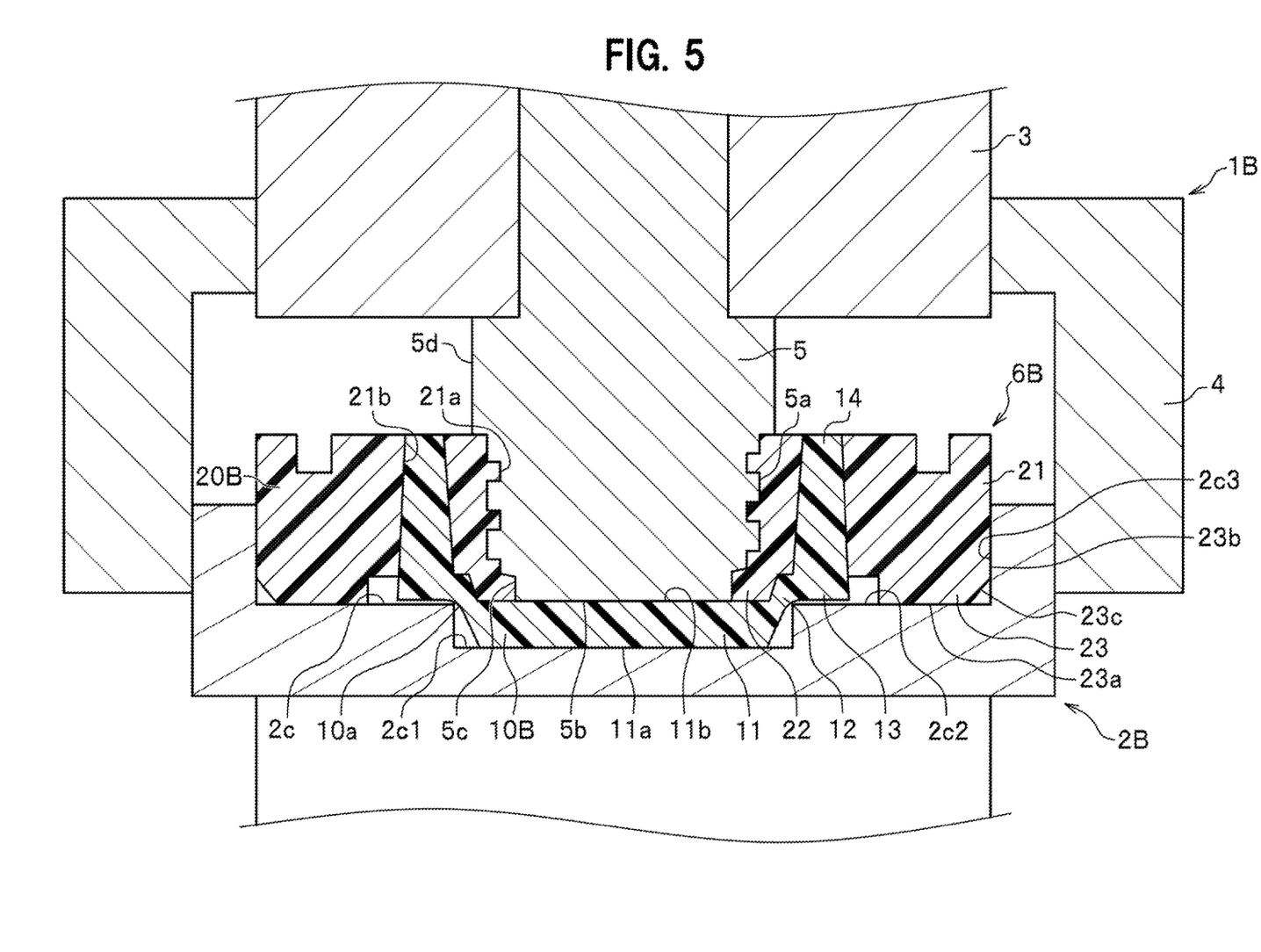
FIG. 5 is a view schematically showing a state in which a clamping device is attached on a bolt.

The socket 4 is externally fitted onto the head 2a of the bolt 2B. Here, the ultrasonic wave propagation member 6B is attached to the bolt 2B by being inserted into the recess 2c formed in the head 2a of the bolt 2B. The fourth contact surface 23b, which is the outer peripheral surface of the second extension 23, comes into contact with an inner peripheral surface 2c3 of the recess 2c, which allows suitable positioning in a direction perpendicular to axes of the ultrasonic wave propagation member 6B and the ultrasonic probe 5. Further, the first contact surface 11a, which is the lower surface of the body 11, comes into contact with the bottom surface 2c1 of the recess 2c, and the third contact surface 23a, which is the lower surface of the second extension 23, comes into contact with the bottom surface 2c2 of the recess 2c. Here, the body 11 is compressed to be deformed by an amount corresponding to a difference in height between the bottom surfaces 2c1 and 2c2. A clearance is secured between the outer peripheral surface of the first extension 12 and an inner peripheral surface formed at a boundary between the bottom surfaces 2c1 and 2c2 of the recess 2c for a time when the body 11 and the first extension 12 are compressed to be deformed. Further, the lower surface of the second extension 13 is configured to be higher than the third contact surface 23a, i.e., at a position separated from the bolt 2B, so that a gap is secured between the bottom surface of the second extension 13 and the bottom surface 2c2 of the recess 2c in a state in which the socket 4 and the ultrasonic wave propagation member 6B are attached on the bolt 2B. This allows the third contact surface 23a to perform a suitable positioning.

Although the embodiments of the present invention are described above, the present invention is not limited to the embodiments described above and may be modified as appropriately without departing from the gist of the present invention.

REFERENCE SIGNS LIST 1A, 1B: clamping device (bolt axial force measuring device)
2A, 2B: bolt (measurement target)
2a: head
2b: recess
2b1: bottom
2b2: inner peripheral surface
2c: recess
2c1, 2c2: bottom
2c3: inner peripheral surface
4: socket
5: ultrasonic probe
5a: male screw (fixing portion)
5b: fore end surface (lower end surface)
6A, 6B: ultrasonic wave propagation member
10A, 10B: ultrasonic wave propagator
10a: R portion
11: body
11a: first contact surface (lower surface)
11b: second contact surface (upper surface)
12: first extension
13: second extension
14: projection
20A, 20B: holder
21: body
21a: female screw (fixing portion)
22: first extension
23: second extension
23a: third contact surface (lower surface)
23b: fourth contact surface (outer peripheral surface)
23c: chamfered portion

The invention claimed is:

1. An ultrasonic wave propagation member comprising:
an ultrasonic wave propagator configured to include a first contact surface coming into contact with a measurement target and a second contact surface that is opposite to the first contact surface and comes into contact with a fore end surface of an ultrasonic probe; and
a holder configured to hold the ultrasonic wave propagator and to include a third contact surface coming into contact with the measurement target on a radially outer position than the first contact surface,
wherein the ultrasonic wave propagator is softer than the holder and includes a projection that is inserted into a hole of the holder from below to fix the ultrasonic wave propagator to the holder.

2. The ultrasonic wave propagation member according to claim 1,
wherein the first contact surface is positioned closer to the measurement target than the third contact surface before being attached to the measurement target.

3. The ultrasonic wave propagation member according to claim 1, wherein
the holder includes a fixing portion fixed to an outer peripheral surface of the ultrasonic probe.

4. The ultrasonic wave propagation member according to claim 3, wherein
the fixing portion is a female screw screwed with a male screw formed on an outer peripheral surface of the ultrasonic probe.

5. An ultrasonic wave propagation member comprising:
an ultrasonic wave propagator configured to include a first contact surface coming into contact with a measurement target and a second contact surface that is opposite to the first contact surface and comes into contact with a fore end surface of an ultrasonic probe; and
a holder configured to hold the ultrasonic wave propagator and to include a third contact surface coming into contact with the measurement target on a radially outer position than the first contact surface, wherein
the ultrasonic wave propagator is softer than the holder,
the first contact surface and the third contact surface come into contact with a bottom surface of a recess formed in the measurement target, and the holder includes a fourth contact surface coming into contact with an inner peripheral surface of the recess.

6. The ultrasonic wave propagation member according to claim 1, wherein
the ultrasonic wave propagator is made of elastomer.

7. The ultrasonic wave propagation member according to claim 6, wherein
the holder is made of polypropylene.

8. An ultrasonic wave propagation member comprising:
an ultrasonic wave propagator configured to include a first contact surface coming into contact with a measurement target and a second contact surface that is opposite to the first contact surface and comes into contact with a fore end surface of an ultrasonic probe; and
a holder configured to hold the ultrasonic wave propagator and to include a third contact surface coming into contact with the measurement target on a radially outer position than the first contact surface,
wherein the ultrasonic wave propagator is softer than the holder and includes a projection that is inserted into a hole of the holder from below to fix the ultrasonic wave propagator to the holder, and
the ultrasonic wave propagator is integrally-molded with the holder in a state in which the projection is inserted into the hole of the holder.

9. An ultrasonic wave propagation member comprising:
an ultrasonic wave propagator configured to include a first contact surface coming into contact with a measurement target and a second contact surface that is opposite to the first contact surface and comes into contact with a fore end surface of an ultrasonic probe; and
a holder configured to hold the ultrasonic wave propagator and to include a third contact surface coming into contact with the measurement target on a radially outer position than the first contact surface, wherein
the ultrasonic wave propagator is softer than the holder, and
the ultrasonic wave propagator includes a projection that extends upward from the fore end surface of the ultrasonic probe at radially outside end of the ultrasonic probe to be located into a hole of the holder.

* * * * *